Figure 1:
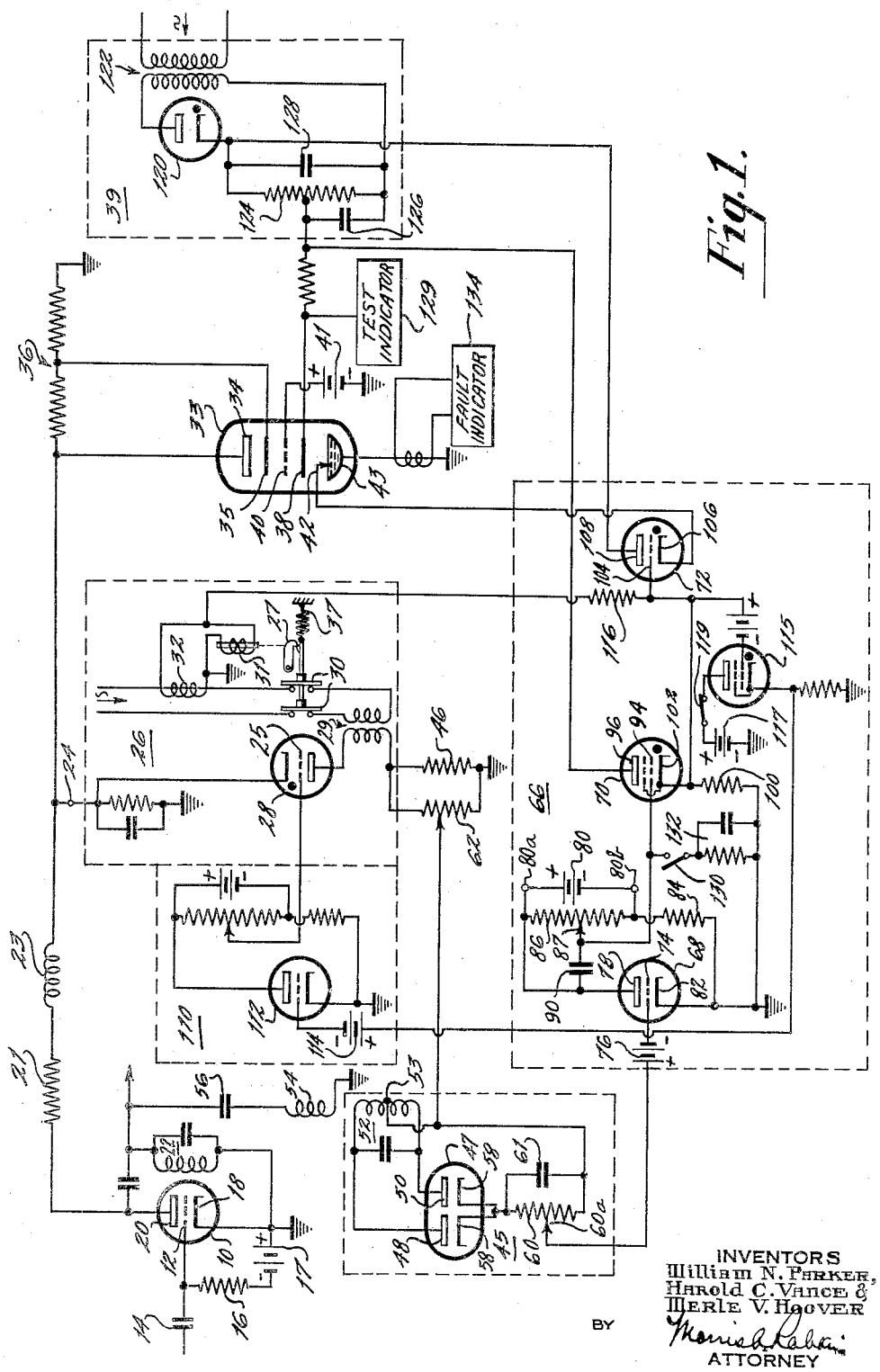

Patented Nov. 13, 1951

2,575,232

UNITED STATES PATENT OFFICE 2,575,232

ELECTRON TUBE PROTECTIVE SYSTEM

William N. Parker, Lancaster, and Merle V. Hoover, Mountville, Pa., and Harold C. Vance, Maplewood, N. J., assignors to Radio Corporation of America, a corporation of Delaware Application March 9, 1950, Serial No. 148,688

16 Claims. (Cl. 315—349)

This invention relates to improvements in electron tube protective systems, and particularly to systems for protecting electron tubes from abnormal localized currents.

In a copending application of L. P. Garner, Serial No. 148,723, filed March 9, 1950, now Patent No. 2,571,027, and assigned to the same assignee as the present invention, there is described and claimed an extremely fast acting system for protecting a high power oscillator or amplifier tube by short-circuiting the power supply of the tube upon the occurrence of a high current fault such as an internal arc or an internal short. The short-circiting device preferably comprises a normally non-conductive electron tube containing sufficient gas or vapor so that, when conducting current, the voltage drop thereacross will have a low, substantially constant value characteristic of a gas or vapor discharge (such a tube being referred to hereinafter as a "gas tube"). The initiation of current flow (hereinafter designated "firing") in the gas tube is arranged to occur only in response to the occurrence of a fault in the protected tube. It is one of the objects of the present invention to provide an improved fault-detecting and gas tube firing arrangement for such protective systems.

In the above-mentioned Garner system, the gas tube firing voltage is derived from the current increase which accompanies a high current fault in the protected tube. While this fault detection arrangement is basically sound, it does not provide maximum possible sensitivity under all conditions of operation. For example, if a high power amplifier tube is being operated "Class C," so that tube current only flows during a part of each cycle of alternating voltage, the gas tube must be adjusted so that it will not fire until the protected tube current exceeds the normal peak value. This makes it possible for a fault to reach serious proportions before the protective system responds.

Accordingly, it is a further object of the invention to provide an improved fault detection circuit which is adapted to differentiate between a high-current fault in the protected tube and other non-injurious changes in system operation.

In accordance with one feature of the invention, certain of the foregoing and other objects and advantages are attained by providing a fault detecting circuit which depends for its operation on the unbalance between input and output power which accompanies a high current fault in the protected tube. Taking tube output voltage as substantially representative of output power, and tube input current as substantially representative of input power, the fault detecting circuit is arranged to fire the protecting gas tube only upon simultaneous opposite changes occurring in these two parameters, thereby insuring rapid and dependable operation of the protective system.

Further features of the present invention are the provision of means for initiating power supply cutoff simultaneously with short-circuiting thereof, and the provision of an improved amplifier to facilitate coupling between the detecting circuit and the short-circuiting tube. Other features and advantages will be brought out hereinafter.

A more complete understanding of the invention can be had by reference to the following description of illustrative embodiments thereof, when considered in connection with the accompanying drawing, the single figure of which is a circuit diagram of an electron tube protective system arranged in accordance with the invention.

Referring to the drawing, there is shown a triode electron tube 10 connected as an alternating voltage amplifier, as, for example, in the output stage of a conventional radio transmitter. It will be understood that the tube could as well be connected as an oscillator by providing suitable feedback connections between the anode and control grid circuits. Also, the protection of a tube connected as a modulator or as a buffer is deemed to be within the scope of the invention.

The tube 10 is arranged to amplify alternating voltages applied to the control grid 12 thereof through a coupling capacitor 14. The usual grid-return resistor 16 and bias voltage source, shown as a battery 17, are connected between the control grid 12 and the grounded cathode 18 of the tube 10. The tube anode 20 is connected to a resonant tank circuit 22 from which amplified alternating voltages can be supplied to any suitable load (not shown), such as an antenna, an additional amplifier, or the like.

The tube anode 20 is connected through a resistor 21 and a choke coil 23 to the positive terminal 24 of a unidirectional voltage supply source 26, shown as a grid-controlled gas rectifier (see e. g. "Mercury Arc Power Rectifiers," Marti and Winograd, McGraw-Hill Book Company, 1930, pg. 397–401). In the usual case, the power supply 26 will include several rectifier tubes operated with polyphase input voltages. For simplicity, a single grid controlled rectifier tube 28 is shown, connected to rectify alternating voltage applied from a suitable source (not shown) through a transformer 29 and an electro-mechanical circuit breaker. The circuit breaker is shown schematically as a set of contacts 30 held closed against the action of a spring 37 by a latch 27 which is arranged to be opened by a relay 31. The relay 31 is connected to a pick-up winding 32 linked to one of the alternating current input leads, so that the relay 31 will be energized and will release the latch 27 to open the contacts 30 if excessive current is drawn by the rectifier 28. Further details of operation of the power supply 26 are given hereinafter.

In the case of a high power radio transmitter, the voltage applied to the tube anode 20 from the power supply 26 may be of the order of several thousand volts. As long as the tube 10 is functioning properly, the power dissipated at the tube anode 20 will be within safe limits. However, if an arc should form between the tube anode 20 and cathode 18 through stray residual gas in the tube 10, the tube current will rise far beyond its rated value, and this excessive current ordinarily will flow between localized spots on the anode and cathode. Under these conditions, one or both of the tube electrodes 18, 20 may melt through within a few hundred microseconds.

In accordance with the aforementioned Garner application, protection for the tube 10 is provided by a normally non-conductive short-circuiting device comprising an ignitron type gas tube 33 shunted across the power supply 26. The main anode 34 of the ignitron 33 is connected directly to the positive power supply terminal 24, and the ignitron dividing anode 35 is connected to the same terminal 24 through a voltage divider 36. The ignitron 33 has an auxiliary anode 38 energized from a separate power supply 39 (described hereinafter), and a grid electrode 40 which is supplied with a fixed positive voltage from a suitable source, such as a battery 41. While it is more conventional to operate an ignitron tube with a negative grid bias, it has been found that a positive bias will cause the ignitron to fire more rapidly. An igniter electrode 42 is connected to receive firing voltage from a fault detecting circuit, as described hereinafter, and the mercury pool cathode 43 is connected to ground.

In accordance with the usual principle of operation of the ignitron type tube, the tube 33 will be non-conductive until a positive voltage is applied to the igniter electrode 42. Thereupon, a small arc will form between the igniter 42 and the cathode pool 43, and this small arc will spread to the anodes 34, 35, 38 substantially instantaneously. Although the ignitron 33 is adapted to withstand very high voltages prior to firing, the voltage drop thereacross after firing is very low— say of the order of 15 or 20 volts. By arranging the ignitron 33 to fire in response to the occurrence of a high current fault in the tube 10, it can be seen that the ignitron effectively will short-circuit the power supply 26 if such a fault occurs, thereby diverting the current which otherwise would soon ruin the protected tube.

In accordance with the invention, the fault detection circuit shown in Fig. 1 includes a network 45 for generating a voltage proportional to the protected tube output voltage, combined with a resistor 46 connected in the power supply negative return lead to generate a voltage proportional to protected tube current. The network 45 comprises a rectifier 47 having two anode electrodes 48, 50 connected to opposite ends of a resonant circuit 52. This resonant circuit 52 is coupled to the output circuit 22 of the tube 10 through a small coupling coil 54 and an isolating capacitor 56. The cathodes 58 of the rectifier 47 are connected through a potentiometer 60 to a center tap 53 on the coil in the resonant circuit 52. A capacitor 61 preferably is provided to smooth the voltage across the potentiometer 60.

It can be seen that the magnitude of the voltage developed across the potentiometer 60 in the network 45 will be dependent on the amount of alternating voltage induced in the resonant circuit 52 from the protected tube output circuit 22. On the other hand, the magnitude of the voltage developed across the resistor 46 will be dependent on the amount of current drawn by the protected tube 10. The potentiometer 60 is connected to the resistor 46 through a potentiometer 62 to combine the voltage developed across the resistor 46 with that developed across the potentiometer 60.

Upon the occurrence of a high current fault in the protected tube 10, the power output of the tube 10 will decrease, as will the output voltage thereof, causing a corresponding decrease in the voltage across the potentiometer 60. While this voltage change might be suitably amplified and utilized to fire the ignitron 33, the arrangement must be such that the ignitron will respond only if the tube output changes due to a fault, and not due to changes such as will occur when the transmitter is "keyed" off and on, for example.

By combining the voltages across the resistor 46 and the potentiometer 60 in polarity opposition, the desired differentiation between normal and abnormal operation can be obtained. It can be seen that the voltage (with respect to ground) at the tap 60a of the potentiometer 60 will have a positive component proportional to the alternating voltage output of the protected tube 10, and a negative component proportional to the protected tube current. During normal operation of the tube 10, the voltage across the power supply resistor 62 will decrease (become less negative) each time that the tube output decreases, as when the system is "keyed" off, for example, thereby offsetting the accompanying decrease in the positive voltage across the resistor 60. However, if a fault develops in the tube 10, the current through the tube 10, the power supply 22, and the resistor 46 will increase, thereby producing a more negative voltage across the potentiometer 62, while the rectified voltage across the potentiometer 60 will decrease (become "more negative"). The net effect will be to produce an increasingly negative voltage at the potentiometer tap 60a, and one which becomes more negative at a rate substantially twice that of either the tube input change or tube output change taken alone.

In order to fire the ignitron 33 when a fault is detected, the increasing negative voltage at the potentiometer tap 60a must be converted to a positive voltage. While a fault ordinarily will develop very rapidly, it has been found that faults occasionally develop rather slowly, although the reason for this is not clearly understood. Consequently, direct coupling should be used between the fault detector and the ignitron to provide protection against faults which develop relatively slowly. To this end, a three-stage direct coupled amplifier and impulse generator 66 is provided, including a triode tube 68, connected in a novel direct current amplifier circuit, followed by a tetrode gas tube 70 and a triode gas tube 72. The control grid 74 of the amplifier tube 68 is connected to the potentiometer tap 60a in the network 45 through a small bias battery 76. The voltage of the bias battery 76 and the settings of the potentiometers 60, 62 are selected so that the tube 68 normally will conduct a predetermined amount of current, as explained hereinafter.

The circuit of the amplifier tube 68 is arranged to provide a negative bias voltage which will prevent conduction in the gas tetrode 70 as long as the tube 68 is conducting a predetermined amount of current. The amplifier tube anode 78 is connected to the positive terminal 80a of a voltage source, shown as a battery 80, while the tube cathode 82 is connected to the negative terminal 80b of the battery through a resistor 84. The battery 80 is shunted by a potentiometer 86, and a capacitor 90 is connected between the tube anode 78 and the tap 87 of the potentiometer 86.

In the amplifier circuit just described, it can be seen that the battery 80 and the potentiometer 86 effectively are "floating" between the resistor 84 and the tube anode 78. Hence, some point on the potentiometer 86 between the battery terminals 80a, 80b will be at ground potential.

It is evident that the magnitude and polarity (with respect to ground) of the voltage at the potentiometer tap 87 will be dependent on the setting of the tap 87 and on the amount of current flowing in the tube 68 and the resistor 84. Accordingly, it is relatively simple to set the potentiometer tap 87 so that the voltage at the tap 87 will be negative by a predetermined amount as long as a predetermined amount of current flows through the tube 68. If the tube current decreases, the voltage at the tap 87 will become less negative. Thus, the grid 94 of the gas tetrode 70 can be connected to the tap 87 to maintain negative cutoff voltage at the tetrode grid 94 as long as the amplifier tube 68 is conducting the predetermined current. Upon the occurrence of a fault in the protected tube 10, the current through amplifier tube 68 will decrease, and the voltage at the tap 87 will rise, firing the tetrode 70. The required normal current through the amplifier tube 68 can be adjusted by the settings of the potentiometers 60, 62 and by the voltage of the bias battery 76. Hence, the circuit of the amplifier 68 together with the fault detection circuit previously described provide great flexibility in adapting the protective system to various operating conditions.

The capacitor 90 between the tube anode 78 and the potentiometer tap 87 will greatly improve the circuit response to sudden voltage changes. Since the battery 80 (or any conventional unidirectional voltage source) normally will have a large amount of internal capacity, the battery terminals 80a, 80b will be substantially at the same alternating voltage. Consequently, any sudden change in voltage across the resistor 84 will also appear at the tube anode 78, and can be reproduced substantially instantaneously at the potentiometer tap 87 by coupling the tap 87 to the tube anode 78 through the capacitor 90.

The gas tetrode anode 96 is connected to the power supply 39, and a load resistor 100 is connected between the gas tetrode cathode 102 and ground.

In order to maintain direct coupling and to provide a strong firing impulse to the ignitron 33, the triode gas tube 72 preferably is of a type which requires a positive grid-to-cathode firing voltage and which has high power handling capacity, such as a commercial type 5C22. The control grid 104 of the gas triode 72 is connected to the cathode load resistor 100 of the tetrode 70, and the cathode 106 of the triode 72 is connected to the ignitor electrode 42 in the ignitron 26. The anode 108 of the triode 72 is connected to the voltage supply source 39. Upon the occurrence of a high-current fault in the protected tube 10, the triode 72 will be fired by the positive voltage developed across the resistor 100. When the triode 72 conducts, an arc will be struck between the ignitor electrode 42 and the cathode pool 43 in the ignitron 33, firing the ignitron 33 and short-circuiting the power supply 26.

Although the action of the ignitron tube 33 will serve to protect the electron tube 10 against the occurrence of a fault therein, it is evident that the ignitron 33 will draw a relatively large current from the power supply 22. While this heavy current drain eventually would cause operation of the circuit breaker relay 31, more effective power supply protection can be obtained by causing the circuit breaker to respond directly to the fault detection circuit. Alternatively, if a grid-controlled rectifier power supply is used, the grids of the rectifier tubes can be blocked in response to the occurrence of a fault.

For example, a power supply blocking unit 110 can be connected to negatively bias the control grid 25 of the rectifier tube 28 in the power supply when a fault occurs in the tube 10. Illustratively, the blocking unit 110 may consist of a triode 112 connected in a direct current amplifier circuit similar to that already described for the tube 68 in the amplifier and impulse generator 66. In the blocking unit 110, the tube 112 normally is biased beyond cutoff by a battery 114, so that the voltage at the control grid 25 of the rectifier 28 normally will allow current to flow therein.

The amplifier 112 preferably is coupled to the fault detecting network through a normally nonconductive gas tube 115. The gas tube 115 is furnished with anode voltage from a source, shown as a battery 117, through a normally closed switch 119.

When a fault occurs in the tube 10, the voltage developed across the resistor 100 will fire the tube 115. This, in turn, will turn on the blocking tube 112, dropping the voltage at the rectifier control grid 25 sufficiently to prevent further conduction in the rectifier 28. If a fault occurs during a half cycle of conduction in the rectifier 28, the control grid 25 will be unable to cut off the rectifier current until the end of that particular half cycle. However, the gas tube 115 will continue to conduct current until the switch 119 is opened, thereby insuring that the blocking voltage will be maintained at the rectifier grid 25, so that the rectifier 28 will be blocked as quickly as possible.

Where the power supply is provided with an electromechanical circuit breaker, such as is illustrated in the drawing, the circuit breaker also can be operated simultaneously with the firing of the ignitron 33 by connecting the relay coil 31 to the resistor 100 through a resistor 116 sufficiently large to maintain proper impedance relations in the circuit. Thus, when the gas tetrode 70 is fired, part of its current will flow through the pickup coil 32 and relay 31, thereby opening the supply line to the transformer 29.

After the protective system has functioned, the ignitron firing circuits must be reset in readiness for the occurrence of another fault. To provide automatic resetting, the power supply unit 39 for the ignitron auxiliary anode 38 and for the gas tubes 70, 72 preferably is of the half-wave rectifier type, and may comprise a gas diode 120 connected to receive alternating voltage from a suitable source (not shown) through a transformer 122. Voltages for the gas tubes 70, 72 and for the ignitron auxiliary anode 38 are taken from suitable points on a voltage divider 124, with filter capacitors 126, 128 being provided in the usual manner.

Since the gas diode 120 will conduct only on alternate half cycles of input voltage, the capacitors 126, 128 can be discharged by the ignitron 33 and the gas tubes 70, 72 between conduction periods of the diode 120. This will have the effect of removing the anode voltage from the tubes 70, 72 and from the ignitron anode 38, thereby stopping the flow of current to the anode 38 and in the tubes 70, 72 after a fault in the tube 10 has been extinguished.

In order to test the operation of the amplifier and impulse generator 66, a test indicator 129 is connected to respond to current flow to the auxiliary anode 38 in the ignitron 33, and a switch 130 is provided to temporarily ground the tetrode control grid 94 through a resistor-capacitor network 132. With the power supply 26 turned off, closing of the switch 130 will fire the tetrode 70, thereby firing the gas triode 72, and current will flow only to the auxiliary anode 38 in the ignitron 33. A fault indicator 134 is coupled to the ignitron cathode lead to respond only when full current flows through the ignitron 33. It is deemed preferable to provide separate indicators for testing and for fault indicating because if a fault occurs and the ignitron fails to provide the expected protection, it is helpful to know whether or not the failure was in the fault-detecting circuits or in the ignitron itself (as, for example, where the ignitron main anode 34 becomes disconnected from the power supply 26).

What is claimed is:

1. A fault-detecting circuit for an electron tube connected to amplify alternating voltages, said circuit comprising a first voltage generating means in circuit with said tube for generating a first unidirectional voltage in response to current flow through said tube, a second voltage generating means coupled to said tube to generate a second unidirectional voltage proportional in magnitude to the alternating output voltage of said tube, and means to combine said first and said second unidirectional voltages in polarity opposition to provide a fault-indicating voltage of magnitude dependent on the relative magnitudes of said first and second voltages.

2. A fault-detecting circuit as defined in claim 1 wherein said first means comprises a first resistor connected in series with said tube and said second means comprises a rectifier network connected to rectify said alternating output voltage of said tube.

3. A fault-detecting circuit for an electron tube protective system of the type wherein a normally non-conductive short-circuiting device is shunted across the supply voltage source for an electron tube connected to amplify alternating voltages, said circuit comprising a first voltage generating means in circuit with said tube for generating a first unidirectional voltage in response to current flow through said tube, a second voltage generating means coupled to receive alternating voltage from said tube to generate a second unidirectional voltage proportional in magnitude to the alternating output voltage of said tube, means to combine said first and said second unidirectional voltages in polarity opposition to provide a fault-indicating voltage of magnitude dependent on the relative magnitudes of said first and second voltages, and means to initiate conduction in said device in response to said fault-indicating voltage.

4. A fault-detecting circuit as defined in claim 3 wherein said first means comprises a first resistor connected in series with said tube and said second means comprises a full wave rectifier network connected to rectify alternating voltage received from said tube.

5. A system for protecting an electron tube connected in a circuit to amplify alternating voltages, said circuit including a unidirectional voltage source connected to furnish anode voltage to said tube, said system comprising a normally non-conductive gas tube shunting said voltage source to short-circuit said source in response to a voltage of predetermined magnitude applied to a firing control electrode of said tube, means in circuit with said tube for generating a first unidirectional voltage in response to current flow through said tube, means coupled to said tube to generate a second unidirectional voltage proportional in magnitude to the alternating output voltage of said tube, and means coupled to said gas tube to combine said first and said second unidirectional voltages in polarity opposition to provide to said gas tube a fault-indicating voltage of magnitude dependent on the relative magnitudes of said first and second voltages.

6. In a fault-detecting circuit for an electron tube connected to amplify alternating voltages, in combination, a resistor in series with said tube for generating a first unidirectional voltage in response to current flow through said tube, a network comprising a full-wave rectifier and a resistor connected to said tube to generate a second unidirectional voltage from alternating voltage received from said tube, and means including connections between said resistors for combining said first and second unidirectional voltages in polarity opposition to provide a fault indicating voltage of magnitude dependent on the relative magnitudes of said first and said second unidirectional voltages.

7. A fault detecting circuit as defined in claim 6 wherein said network includes a resonant circuit coupled to said electron tube.

8. In a protective system for an electron tube connected to amplify alternating voltages and supplied with unidirectional operating voltage from a high voltage source, in combination, an ignitron gas tube having an anode, a mercury pool cathode, and an igniter electrode, a circuit connecting said gas tube in parallel with said voltage source, a resistor connected between said electron tube and said voltage source to develop across said resistor a voltage proportional to the current flow through said electron tube, a rectifier network coupled to said electron tube to generate a unidirectional voltage proportional in magnitude to the alternating output voltage of said electron tube, means coupling said resistor and said rectifier network to combine the voltages generated across said resistor and in said rectifier network, and means coupling said combining means to said igniter electrode to fire said ignitron tube in response to a predetermined combined value of said first and said second unidirectional voltages.

9. A fault-detecting and amplifying network for an electron tube protective system of the type wherein a normally non-conductive short-circuiting device is shunted across the supply voltage source for an electron tube which is connected in a circuit to amplify alternating voltages, said network comprising means coupled to said circuit to generate a first unidirectional voltage proportional in magnitude to the current flowing through said tube, means coupled to said circuit and to said first means to generate a second unidirectional voltage proportional in magnitude to the current flowing through said tube, means coupled to said circuit and to said first means to tional in magnitude to the difference between said first unidirectional voltage and the amplified alternating output voltage of said tube, a direct current amplifier connected to said last-mentioned means to amplify said second unidirectional voltage, a first normally non-conductive gas tube having a control grid connected to said direct current amplifier and adapted to fire in response to a predetermined output voltage from said direct current amplifier, and a second normally non-conductive gas tube coupled between said first gas tube and said short-circuiting device and adapted to fire in response to firing of said first gas tube to initiate current flow in said device.

10. Apparatus as defined in claim 9 including, as a source of operating voltage for said gas tubes, a half-wave rectifier power supply whereby to permit deenergizing said gas tube after firing thereof.

11. In a protective system for an electron tube connected to amplify alternating voltages and energized from a unidirectional voltage source, said system comprising (1) a circuit connected in parallel with said voltage source and including a normally non-conductive gas tube having a firing control electrode, and (2) fault-detecting means in circuit with said electron tube for generating a voltage to fire said gas tube in response to abnormal current flow through said electron tube, the improvement which comprises a circuit connecting said fault detecting means to said firing control electrode and including a grid-controlled gas tube, and a second electron tube having an anode, a cathode, and a control grid, a second unidirectional voltage source connected between said anode and said cathode, a potentiometer in parallel with said second voltage source, a resistor connected between said cathode and said second voltage source, and a connection from a tap on said potentiometer to the grid of said grid controlled gas tube.

12. In a protective system for an electron tube connected to amplify alternating voltages and energized from a rectifier-type power supply, said system comprising (1) a normally non-conductive short-circuiting element connected in parallel with said voltage source for short-circuiting said voltage source upon the occurrence of a fault in said electron tube, and (2) a circuit breaker connected between an alternating voltage source for said power supply and said power supply to open the circuit between said source and said supply in response to a current of predetermined magnitude flowing through a control element of said circuit breaker, in combination, means coupled to said circuit to generate a unidirectional voltage proportional in magnitude to the difference between a voltage derived from the current flowing through said electron tube and a voltage derived from the amplified alternating output voltage of said tube, and means coupling said first named means to said control element and to said short-circuiting element for establishing current flow through both of said elements in response to a voltage of predetermined magnitude from said first named means.

13. In a direct current amplifier for generating an output voltage of changing polarity in response to a change in magnitude of a unidirectional input voltage, in combination, an electron tube having an anode, a cathode, and a control grid, a unidirectional voltage source having a positive terminal connected to said anode and a negative terminal connected to said cathode, a resistor connected between said cathode and said negative terminal, and a potentiometer connected in parallel with said voltage source.

14. An amplifier as defined in claim 13 including a source of unidirectional bias voltage connected between said cathode and said control grid and of polarity and magnitude such as normally to prevent current flow in said electron tube, and a source of variable unidirectional voltage to be amplified connected to said control grid, said voltage to be amplified being of polarity opposite to that of said bias voltage.

15. An amplifier as defined in claim 13 including a source of unidirectional bias voltage connected between said cathode and said control grid and of polarity and magnitude such as normally to allow current to flow in said electron tube, and a source of variable unidirectional voltage to be amplified connected to said control grid.

16. An amplifier as defined in claim 13 including a capacitor connected between said potentiometer tap and said anode.

WILLIAM N. PARKER.
MERLE V. HOOVER.
HAROLD C. VANCE.

No references cited.